United States Patent
Bayer

(10) Patent No.: US 8,545,614 B2
(45) Date of Patent: Oct. 1, 2013

(54) ADDITIVES COMPRISING CELLULOSE ETHERS FOR CERAMICS EXTRUSION

(75) Inventor: Roland Bayer, Walsrode (DE)

(73) Assignee: Dow Global Technologies LLC, Midland, MI (US)

( * ) Notice: Subject to any disclaimer, the term of this patent is extended or adjusted under 35 U.S.C. 154(b) by 356 days.

(21) Appl. No.: 12/993,026

(22) PCT Filed: Jun. 19, 2008

(86) PCT No.: PCT/IB2008/003475
§ 371 (c)(1),
(2), (4) Date: Nov. 16, 2010

(87) PCT Pub. No.: WO2009/153617
PCT Pub. Date: Dec. 23, 2009

(65) Prior Publication Data
US 2011/0071023 A1   Mar. 24, 2011

(51) Int. Cl.
*C04B 33/13* (2006.01)
*C04B 38/00* (2006.01)
*C04B 103/00* (2006.01)

(52) U.S. Cl.
CPC ......... *C04B 33/1305* (2013.01); *C04B 38/0006* (2013.01); *C04B 2103/0053* (2013.01); *C04B 2235/6021* (2013.01)
USPC .................. 106/197.01; 106/177.1; 106/194.2

(58) Field of Classification Search
USPC .................... 106/177.1, 194.2, 197.01, 198.1
See application file for complete search history.

(56) References Cited

U.S. PATENT DOCUMENTS

| | | | |
|---|---|---|---|
| 3,907,579 A | 9/1975 | Ravault | |
| 3,991,029 A | 11/1976 | Adelman | |
| 4,001,028 A | 1/1977 | Frost et al. | |
| 4,267,086 A | 5/1981 | Pett et al. | |
| 5,824,143 A | 10/1998 | Chalasani et al. | |
| 5,966,582 A | 10/1999 | Chalasani et al. | |
| 6,284,188 B1 | 9/2001 | Andou et al. | |
| 6,316,383 B1 | 11/2001 | Tacke et al. | |
| 2007/0004826 A1 | 1/2007 | Bayer et al. | |

FOREIGN PATENT DOCUMENTS

JP   59-36278   2/1984

OTHER PUBLICATIONS

"Natrosol® Hydroxyethylcellulose", Aqualon (Aug. 1999), p. 12.*
Sarkar, Nitis, et al., Methylcellulose Polymers as Multifunctional Processing Aids in Ceramics, American Ceramic Society Bulletin, Nov. 1983, Ceramic-Metal Systems Division Meeting Program, pp. 1280-1288.
Reed, James et al., Principles of Ceramics Processing, Second Edition, 1995, John Wiley & Sons, Inc., Chapter 23, Extrusion and Plastic Deformation Forming, pp. 451-471.
Kyoko, Makino, et al., NGK Insulators Ltd., Patent Abstracts of Japan, "Production of Cordierite-Based Ceramic Honeycomb Structure", Aug. 15, 2000.
Li, Keliang, et al., The progress in the study of chemically initiated gelatin material, Nov. 2005, "Study and Development of Geopolymeric Materials", Ruidi High Technology Company, Nanjing Hydrautic Research Institute, Nanjing 210029, pp. 1-5.

* cited by examiner

*Primary Examiner* — David M Brunsman

(57) ABSTRACT

The present invention relates to specific additives comprising cellulose ether, a plasticizer, at least one defoamer and water having a pH greater than 7 for improving the extrudability of clay ceramic masses and other masses which set as a result of baking or sintering, a corresponding extrusion process, the extrudates and their use.

17 Claims, No Drawings

ADDITIVES COMPRISING CELLULOSE ETHERS FOR CERAMICS EXTRUSION

This application is a 371 of PCT/IB2008/003475 filed Jun. 19, 2008.

The present invention relates to specific additives comprising cellulose ether for improving the extrudability of ceramic masses and other masses which set as a result of baking or sintering, a corresponding extrusion process, the extrudates and their use.

Water-soluble cellulose ethers have been used for many years as water retention agents, plasticizers and lubricants in the extrusion of ceramic masses and other masses which set as a result of baking or sintering to produce honeycomb bodies or other complicated profiles having similarly fine structures (see, for example: James S. Reed, Principles of Ceramics Processing, John Wiley & Sons, 1995, Chapter 23: Extrusion and Plastic Deformation Forming, p. 450 ff.)

The extrusion of ceramic masses and other masses which set as a result of baking or sintering is carried out by pressing a plastic mass through a die to produce any desired profiles, preferably honeycomb profiles as are used in catalysts or diesel soot particle filters. These masses can have various compositions and basically comprise a material, in particular a ceramic material, which is sinterable or hardens as a result of a ceramic baking process. They can further comprise catalytically active materials, fibers, aggregates and lightweight aggregates.

Technical and economic disadvantages of the usually extruded ceramic masses and other masses which set as a result of baking or sintering are high extrusion pressures which make operation of the extruders prematurely uneconomical due to high wear or high power costs. Another disadvantage is an unsatisfactorily low extrusion rate which reduces the capacity of the entire plant. The mass should undergo very little heating as a result of internal friction, since the consumption of cooling water or electric cooling likewise impairs the economics. The mass should be able to be extruded without cracks and form no cracks after drying of the extruded profile in air and subsequent baking or sintering. The cohesion of the particles in the extruded mass should be so high that even thin webs should be able to be extruded without problems. The shrinkage on drying and the shrinkage after baking should be minimal and virtually no crack formation should take place.

It has now surprisingly been found that the extrudability of such masses can be improved considerably when (A) at least one cellulose ether, (B) at least one plasticizer and (C) at least one defoamer are added as individual components or as premixed additive, and in a particular embodiment, when the mass contains clay such as used to form a cordierite or mullite body, the mass to be extruded is comprised of water at a pH greater than 7.

The invention accordingly provides a process for the extrusion of ceramic masses comprised of clay which set as a result of baking or sintering, which comprises mixing a ceramic mass or other mass which sets as a result of baking or sintering with (A) at least one cellulose ether, (B) at least one plasticizer, (C) at least one defoamer as individual components or as premixed additive and subsequently extruding it, and (D) water at a pH greater than 7.

The invention therefore also provides ceramic masses comprised of clay which set as a result of baking or sintering, which comprise (A) at least one cellulose ether, (B) at least one plasticizer and (C) at least one defoamer and also additives for the extrusion of ceramic masses and other masses which set as a result of baking or sintering which comprise (A) at least one cellulose ether, (B) at least one plasticizer, (C) at least one defoamer, and (D) water at a pH greater than 7.

For the purposes of the present invention, ceramic mass comprised of clay as a result of baking or sintering are all masses which comprise at least one of the components listed below which can be baked or sintered by baking or sintering alone or with addition of other sintering aids:

alumina; aluminum nitride and aluminum carbide; kaolin; cordierite; mullite; silicon carbide; silicon boride; silicon nitride; titanium dioxide; titanium carbide; boron carbide; boron oxide; silicates and sheet silicates such as talc; silicon metal; carbon as carbon black or graphite; ground glass; other metal oxides such as rare earth oxides; zeolites and related substances. Particular other oxides are those that form cordierite or mullite when mixed with clay (e.g., silica and talc for forming cordierite and alumina when forming mullite).

Clay means a hydrated aluminum silicate having a platy structure and forms plastic masses when mixed with water. Typically, clays are comprised of one or more crystalline structures such as kaolins, illites and smectites.

The term "ceramic masses and other masses which set as a result of baking or sintering" does not include hydraulic binders such as cement or gypsum and masses based on cement or gypsum. These hydraulic binders set as a result of incorporation of water into the crystal lattice.

The above-mentioned masses can also comprise fibers which leave behind pores after baking or remain in the mass and thus increase the flexural strength.

For the present purposes, fibers are all types of natural or synthetic fibers such as fibers based on cellulose, bamboo, coconut, polyethylene, polypropylene, polyamide, polyacrylonitrile, carbon, glass, ceramic and other mineral fibers. Their fiber lengths and thicknesses can be varied within wide ranges.

Suitable cellulose ethers (A) are, in particular, ionic cellulose ethers such as sulfoethylcellulose or carboxymethylcellulose and salts thereof, or nonionic cellulose ethers such as alkylcelluloses, hydroxyalkylalkylcelluloses or hydroxyalkylcelluloses, in particular methylcellulose, methylhydroxyethylcellulose, methylhydroxypropylcellulose, hydroxyethylcellulose, ethylhydroxyethylcellulose, methylethylhydroxyethylcellulose, methylhydroxyethylhydroxypropylcellulose, methylhydroxyethylhydroxybutylcellulose or cellulose ethers which at the same time comprise methyl groups and longer-chain hydrophobic side chains as well as mixtures of the above-mentioned products.

The viscosities of the above-mentioned cellulose ethers are generally from 400 to 200 000 mPa·s, determined in a 2% by weight aqueous solution at 20° C. in a Haake rotational viscometer.

Suitable plasticizers (B) are, for example, casein; polycarboxylic acids and salts thereof; polymers which comprise both carboxylic acid monomers or their salts and carboxylate ether monomers, carboxylic ester monomers and other carboxylic acid derivatives, crosslinking bisacrylates and similar monomers as well as mixtures of the above-mentioned products. Among the plasticizers, preference is given to: homopolymers, copolymers and terpolymers of acrylic, methacrylic, crotonic, maleic, fumaric acid and similar monofunctional and bifunctional acids and also their salts, esters and ethers. Examples of ethers are polyalkylene glycol mono(meth)acrylates such as triethylene glycol monoacrylate and polyethylene glycol monoacrylate (having a polyethylene glycol molar mass of 200-2000 g/mol) and also unsaturated polyalkylene glycol ethers without an acid group. Particularly preferred are: homopolymers, copolymers and terpolymers of acrylic and methacrylic acid, their bifunctional acids and also their is salts, esters and ethers. Examples of ethers are polyalkylene glycol mono(meth)acrylates such as triethylene glycol monoacrylate and polyethylene glycol monoacrylate (having a polyethylene glycol molar mass of 200-2000 g/mol) but also unsaturated polyalkylene glycol ethers without an acid group.

Plasticizers here are expressly not from the class of melamine sulfonates or melamine-formaldehyde sulfonates, naphthalene sulfonates, lignosulfonates or mixtures thereof.

Particularly preferred plasticizers are polycarboxylic acid copolymers and salts thereof.

Suitable defoamers (C) are, in particular, pure substances or mixtures in liquid or solid form which comprise at least one of the following: alkylene glycol homopolymers, copolymers, terpolymers and block copolymers, for example based on ethylene oxide or propylene oxide, adducts of alkylene oxides, alkylene glycol ethers of higher alcohols, fatty acid esters, alkylene glycol fatty acid esters, sorbitol fatty acid esters, polyoxyalkylene sorbitol fatty acid esters, addition products of ethylene oxide and propylene oxide and acetylene, phosphate esters such as tributyl phosphate, sodium octylphosphate and the like and also all compounds containing polyether groups or mixtures containing polyether groups which have a defoaming action as well as mixtures of the above-mentioned products. Other useful defoamers include those generally known as silicone defoamers or antifoams, such as available from Dow Corning Inc., Midland, Mich., USA and include, for example, polydimethylsiloxane polymers and emulsions of such polymers in water.

Particularly preferred are alkylene glycol homopolymers, copolymers, terpolymers and block copolymers, for example based on ethylene oxide or propylene oxide, adducts of alkylene oxides, alkylene glycol ethers of higher alcohols, fatty acid esters, alkylene glycol fatty acid esters and the like and also all compounds containing polyether groups or mixtures containing polyether groups which have a defoaming action.

Very particular preference is given to alkylene glycol homopolymers, copolymers, terpolymers and block copolymers, for example based on ethylene oxide or propylene oxide, adducts of alkylene oxides, alkylene glycol ethers of higher alcohols and also all compounds containing polyether groups or mixtures containing polyether groups which have a defoaming action.

Apart from the components (A) to (D) mentioned as important for the purposes of the invention, the masses can also comprise further constituents such as hydrophobicizing agents, redispersion powders, superabsorbents based on crosslinked acrylates and polysaccharides, lubricants (for example polyethylene oxide homopolymers, copolymers and terpolymers), surfactants, accelerators, retardants, fatty acids and esters thereof, polymers based on acids, salts, amides and esters of acrylic acids and methacrylic acids, polyvinyl alcohols including their derivatives and polymers based on urethanes.

The components (A) to (C) are used in the following ratios relative to one another:

The proportion of component (A) based on the total amount of (A), (B) and (C) is preferably from 10 to 91% by weight, particularly preferably from 18 to 91% by weight, very particularly preferably from 25 to 91% by weight.

The proportion of component (B) based on the total amount of (A), (B) and (C) is preferably from 8 to 70% by weight, particularly preferably from 8 to 65% by weight, very particularly preferably from 8 to 60% by weight.

The proportion of component (C) based on the total amount of (A), (B) and (C) is preferably from 1 to 20% by weight, particularly preferably from 1 to 17% by weight, very particularly preferably from 1 to 15% by weight.

The amount of (A), (B) and (C), viewed as a mixture, used in the ceramic mass or other mass which sets as a result of baking or sintering is typically from 0.3 to 10% by weight, preferably from 0.7 to 9% by weight, particularly preferably from 1 to 8% by weight, in each case based on the total formulation.

(A), (B) and (C) can be added to the mass to be extruded either as a prefabricated mixture or else by stepwise addition of the individual components.

The amount of water component (D) used is readily determined by one skilled in the art to make a ceramic mass suitable for extrusion.

The invention further provides the extrudates obtainable by the process of the invention, shaped bodies obtainable therefrom by thermal treatment and their use.

EXAMPLES

As cellulose ether (A), use was made of a hydroxyethylmethylcellulose Walocel VP-M-7701, Dow Wolff Cellulosics GmbH, Germany, viscosity of a 1% aqueous solution at 20° C. determined in a Haake rotational viscometer: 12400-14400 mPa·s.

As plasticizer (B), use was made of Melflux 2651 F, BASF, Germany. This is a polycarboxylate ether.

As defoamer (C), use was made of Agitan P 803, Münzing Chemie, Germany. This is a defoamer based on alkane/glycol applied to a support material.

The additive was prepared by mixing the components (A) to (C) in the relation 67:28:5, while the comparative trials 9 and 10 were done to see the differences between a pure system containing only (A) and a compound system containing all three ingredients (A) to (C).

Procedure For the Extrusion Experiments 100 parts by weight of a cordierite formulation comprised of clay, cordierite CP 820M (Imerys Tableware, Germany) and 1 part by weight (based on 100 parts by weight of cordierite formulation) of the additive according to the invention were firstly mixed dry in a fluidized-bed mixer (manufactured by Lödige, Germany) until is homogeneous mixture was formed. Water at 20° C. was subsequently added, the mass was mixed further and kneaded in a kneader (manufactured by AMK, Aachen, Germany) for a few minutes. The mass was then immediately introduced into the feed trough of a water-cooled, single-screw extruder maintained at 20° C. (Händle 8D, screw diameter 8 cm, from Händle, Mühlacker, Germany). The mass was extruded through a perforated plate and passed through the vacuum chamber for degassing. It was then firstly strained (i.e. pressed through a screen having a mesh size of 0.4 or 0.2 mm in order to free the mass of aggregates) and subsequently extruded through a die (flat profile, 4 cm×1 cm) and discharged onto a conveyor belt. In order to measure the resulting cohesion and green strength of the profile, the profile running over the conveyor belt was allowed to continue to run horizontally over the belt after having passed the end of the belt. The length of the profile "hanging over" the end of the belt was measured before the belt ruptured under its own weight. The table below gives the minimum and maximum measured length of at least 10 subsequently extruded parts of the profiles from the same trial. The amount of water (W/S=0.32 means 0.32 Kg water per 1 Kg of cordierite formulation) was held constant on the particular batch size (each batch contained 5 kg of cordierite formulation and 1.6 Kg of water). The amount of water includes the amount of HCl and or ammonia added to the water.

Explanations to the Following Table

W/S means the water/solids factor, that means the amount of water (W) on top of 100 parts of solids (S). The amount of water used was calculated only on the basis of cordierite.

The stiffness of the mass was tested on the freshly strained samples and was expressed in terms of shore hardness. All masses extruded in this way were set to a customary consistency (Shore hardness=12-12.6 kg/m$^2$) by means of a water to solids ratio (W/S ratio) based on their water requirement.

Pressure is the pressure measured just before passage of the mass through the die. It was measured in bar.

The resulting temperatures of the extruded flat profile (1×4 cm) were measured and were all between 25 and 28° C. The temperature of the strained and extruded masses was measured by means of a noncontact infrared thermometer after leaving the die; these temperatures correspond to those measured via the temperature sensor built into the die head.

To measure the green strength the profile length "hanging over" the belt (in cm) was used. It is the length of the profile, before the rupture happened under its own weight. For each trial there were measured at least 10 samples and the minimum and maximum measured length was given.

lulose ether system (compare trial 3 and trial 10, both by adding 25 g of $NH_3$). The results show clearly that the length of the profile hanging over the belt is increasing with a pH>7 which means consequently, that the cohesion and green strength is increased if the pH of water used to make the ceramic mass is >7. Acidic conditions (please compare trial 1 with trials 6-8) is decrease the green strength and leads in all cases to crack formation at the edges of the extruded profile as well as to a water loss at the die and the pressure sensor. The increase in water loss is a clear indication of decreasing water retention of the system which can lead to the remaining mass in the extruder to densify that will lead to higher friction extrusion pressures, which can lead to further water loss that ultimately can cause the entire extrusion process to break down.

The invention claimed is:

1. A process for the extrusion of a ceramic mass comprised of clay which sets as a result of baking or sintering with (A) at least one cellulose ether, (B) at least one plasticizer, (C) at least one defoamer as individual components or as premixed additive, and (D) water having a pH greater than 7 and subsequently extruding it, wherein clay is a hydrated aluminum silicate having a platy structure and forms plastic masses when mixed with water.

2. The process according to claim 1, wherein the ceramic mass comprised of clay forms upon heating cordierite or mullite.

| Trial nr. | Cellulose ether composition (A:B:C) | W/S | Added ammonia (25%) in g (remark 1) | Added HCl (25%) (remark 1) | Shore hardness | Pressure at the 200 cpsi die (bar) | Profile length "hanging over" the belt (cm), from min.-max length | Resulting pH | Technical comments | Remarks |
|---|---|---|---|---|---|---|---|---|---|---|
| 1 | 67:28:5 | 0.32 | 0 | | 12.3 | 16-17 | 17 | 7 | | Not according to invention |
| 2 | 67:28:5 | 0.32 | 5 | | 12.5 | 16-17 | 16-20 | Not measured | | According to invention |
| 3 | 67:28:5 | 0.32 | 25 | | 12.5 | 17-18 | 16-24 | 9 | | According to invention |
| 4 | 67:28:5 | 0.32 | 50 | | 12.5 | 15-17 | 25-37 | 12 | | According to invention |
| 5 | 67:28:5 | 0.32 | 75 | | 12.3 | 15-17 | 27-38 | 13 | | According to invention |
| 6 | 67:28:5 | 0.32 | | 5 | 12.4 | 16-17 | 15-17 | Not measured | | Not according to invention |
| 7 | 67:28:5 | 0.32 | | 15 | 12.5 | 16-17 | 14.5-16 | Not measured | | Not according to invention |
| 8 | 67:28:5 | 0.32 | | 50 | 12.6 | 17-18 | 14.5-15.5 | Not measured | Crack formation at the edge of the profile, water loss at die and pressure sensor | Not according to invention |
| 9 | 100:0:0 | 0.32 | 0 | | 12.6 | 16-18 | 11.5-13.5 | Not measured | As nr. 8 | Not according to invention |
| 10 | 100:0:0 | 0.32 | 25 | | 12.6 | 18-20 | 13.5-15 | Not measured | As nr. 8 | Not according to invention |

Experimental Results

The comparison of trial 1 (compound-system) with trial 9 (100:0:0-system with 100% of cellulose ether) shows improvements in the green strength at pH 7 by changing to the compound system: the length of the profile increased from 11.5-13.5 cm to 17 cm. By shifting the pH into alkaline conditions in both systems the green strength is increased (in the pure cellulose ether system see trial 9 and 10, in the cellulose ether system see trial 1 and 2-5), but in the compound-system the effect is much larger than in the pure cellulose ether system.

3. The process according to claim 1, wherein cellulose ethers having a viscosity of from 400 to 200,000 mPa·s, determined in an 2% by weight aqueous solution at 20° C., are used as cellulose ether (A).

4. The process according to claim 1, wherein polycarboxylic acid copolymers and/or salts thereof are used as plasticizer (B).

5. The process according to claim 1, wherein defoamers based on polyether are used as defoamer (C).

6. The process according to claim 5, wherein alkylene glycol homopolymers, copolymers, terpolymers or block copolymers are used as defoamer based on polyether.

7. The process according to claim 1, wherein, based on the total amount of (A), (B) and (C), the proportion of component (A) is from 10 to 91% by weight, that of component (B) is from 8 to 70% by weight and that of component (C) is from 1 to 20% by weight.

8. The process according to claim 1, wherein the amount of (A), (B) and (C), viewed as a mixture, used is from 1 to 8% by weight based on the total formulation of the ceramic mass or other mass which sets as a result of baking or sintering.

9. The process according to claim 1, wherein a thermal treatment of the extrudate is carried out after extrusion.

10. The process of claim 1, wherein the pH is at least 9.

11. The process of claim 1, wherein the pH is at least 12.

12. The method of claim 1, wherein the pH of the water is adjusted by the addition of ammonia.

13. The method of claim 1, wherein the defoamer comprises a silicone defoamer.

14. The method of claim 1, wherein the clay is comprised of one or more of kaolin, illites and smectites.

15. A ceramic mass comprised of clay which sets as a result of baking or sintering which comprises (A) at least one cellulose ether, (B) at least one plasticizer, (C) at least one defoamer, and (D) water having a pH of greater than 7; wherein clay is a hydrated aluminum silicate having a platy structure and forms plastic masses when mixed with water.

16. The ceramic mass of claim 15, wherein the pH of the water is at least 9.

17. The ceramic mass of claim 15, wherein the pH of the water is at least 12.

* * * * *